March 2, 1943.   F. A. PARKHURST   2,313,031
MANUFACTURE OF THREADED CONTAINERS
Filed Sept. 16, 1938
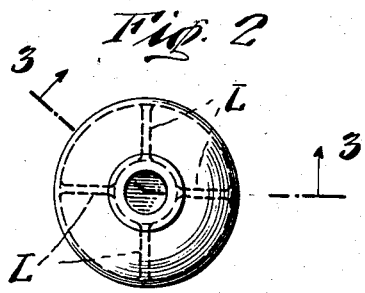
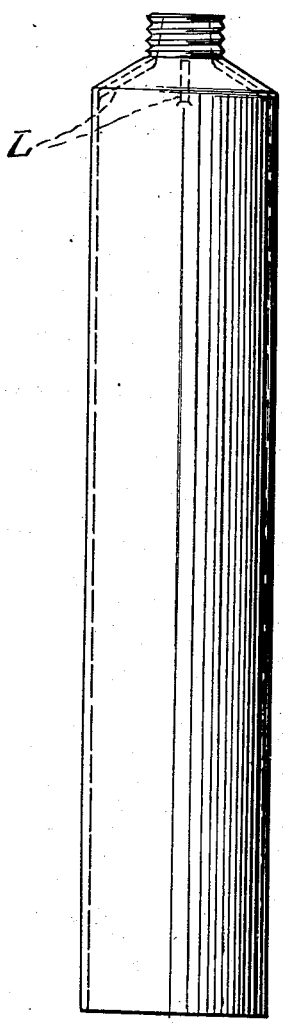
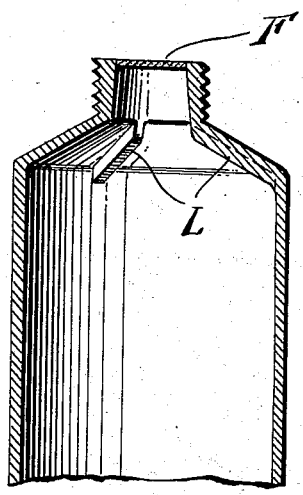
INVENTOR
Frederic A. Parkhurst
BY
Alan M. Mann
his ATTORNEY Patented Mar. 2, 1943

2,313,031

UNITED STATES PATENT OFFICE 2,313,031

MANUFACTURE OF THREADED CONTAINERS

Frederic A. Parkhurst, Suffield, Conn., assignor to Monsanto Chemical Company, a corporation of Delaware Application September 16, 1938, Serial No. 230,224

8 Claims. (Cl. 18—55)

This invention relates to the manufacture from organic plastics of containers having threads at one end. The particular type of containers with which this invention deals are those having approximately parallel sides with no enlargement below the open end so that they can be made by a pressing operation.

Illustrative examples of the type of container to which I refer are collapsible types such as those used for tooth paste and the like, in which the back end is initially the open end, and bottles of approximately uniform internal diameter. The materials which I prefer to use are the flexible heat-softening plastics such as the cellulose esters (particularly cellulose acetate) and the vinyl type resins such as the vinyl acetals, styrenes and acrylates. My invention may also be applied to thermo-setting resins such as the urea-formaldehyde and phenol-formaldehyde resins, but ordinarily will not be found as valuable with those materials as with the flexible thermoplastics.

Basically my process is one involving pressing the plastic material with heat, as distinguished from the type of operation in which a mandrel is dipped into a solution to form a coating which later is dried. The pressing operation gives a better product substantially free from blow holes and also avoids the expense and risk attendant upon solvent removal.

When molding a threaded article of the type with which this case deals, the obvious way of forming the die is to make a mold cavity in two pieces so that it can be opened after the article has hardened. This however detracts from the appearance of the finished article and if the plastic is softened to the point where it flows sufficiently to make the very thin walls required (as for example by a flexible tube) its penetration is so great that it is very difficult to prevent a split mold from leaking.

I have overcome this difficulty by using a one-piece mold cavity and by giving a particular shape to the article to be formed so that it can easily be cleared from the mold. This novel feature consists in forming the exterior of the piece of true circular cross section except for the threaded portion and by so shaping the interior of the article that driving lugs are formed on the inside walls by which it may be gripped and rotated. While these lugs may run up and down the sides as far as desired, it will ordinarily be found preferable to form them by appropriately shaping the end of the plunger so that the lugs are formed by direct pressure against the bottom of the mold cavity. This improves the appearance of the product when it is made of transparent material and the lugs can readily be designed to stiffen and strengthen the initially closed end while leaving the side walls flexible.

One of the problems of making thin walled articles by a pressing operation arises from the difficulty of freeing the article from either the plunger or the mold, and my present invention obviates this difficulty. In carrying out the operation, the molding compound or powder is put in the mold and heated and pressed in the usual manner. When the molded article is hardened, as by cooling in the case of thermoplastic material, the plunger is withdrawn by a straight pull and readily frees itself from the molded article which is held positively in the mold by the external threads. The article can then easily be freed from the mold by inserting an appropriate tool down into it to engage the driving lugs formed in its interior. By rotating this tool, the article is simultaneously loosened from the mold walls and unscrewed from the threaded portion of the mold. The original plunger may be used for this purpose but a separate tool is preferable.

This invention can readily be understood by reference to the accompanying drawing, in which Fig. 1 shows a side view of a flexible tube embodying my invention; Fig. 2 is an end view and Fig. 3 a section on line 3—3 of Fig. 2.

In this case the driving lugs are designated by the letter L and are in the form of ribs running all the way from the side walls to the opening through the usual threaded tip. This tube will ordinarily be molded in gang molds with the threaded ends down. After the removal of the plungers, appropriate tools having slots to receive the lugs L are inserted and the tubes are loosened and unscrewed from the molds. Usually a thin film as indicated at F will close the threaded end but this can easily be removed.

It is understood, of course, that the shape and position of the driving lugs can be modified at will so long as they are inside the article and do not interfere with the direct removal of the plunger. For example, the lugs might cover most of the end of the tube leaving only small grooves between them, giving the appearance of a thickened end with notches formed in it.

In the case of a bottle with approximately uniform internal diameter, outside threads can be molded around the mouth and the driving lugs can be formed by grooves or projections in the bottom. In any case, the article formed must have a truly circular cross section on the outside so that it can be rotated in the mold cavity and be free from threads or other form of undercuts on the inside which would interfere with the mold plunger being removed by a direct draw.

What I claim is:

1. A container of molded organic plastic material which when molded has external threads but which otherwise is circular in external cross section and which is provided with a plurality of internal driving lugs and is free from internal undercuts said driving lugs being arranged around the axis of the container and having substantial radial length and having substantial thickness so that they will resist shear when used for unscrewing the container from the mold cavity in which it is formed.

2. A container as defined in claim 1 in which the driving lugs are formed on that end of said container on which said external threads are located.

3. A collapsible tube of molded flexible organic plastic material having a restricted orifice portion threaded externally to receive a cap but smooth on the inside and having a plurality of inwardly extending projections on the end portion surrounding such orifice said projections being arranged around the axis of the tube and having substantial radial length and having substantial thickness so that they will resist shear when used for unscrewing the tube from the mold cavity in which it is formed.

4. The method of molding thin walled containers of organic plastic material which comprises molding such a container in a cavity mold adapted to form external threads on a portion of the container by a plunger adapted to form a plurality of internal driving lugs having substantial radial length and having substantial thickness in one end of such container but not to form undercuts, removing such plunger by a direct draw while holding the container in the mold cavity by said external threads, and then loosening said container from the mold cavity by rotating said container through pressure exerted on said driving lugs.

5. The method of forming a thin walled collapsible tube entirely of organic plastic material comprising pressing with a plunger, heated molding powder of the organic material in a mold to form the tube with external threads at one end and a plurality of internal driving lugs at the threaded end of the tube having substantial radial length and having substantial thickness, withdrawing said plunger from the molded tube without removing said tube from the mold, and loosening said tube from the mold cavity walls and simultaneously unthreading the threaded end of said tube from the mold by pressure applied to said lugs adapted to cause the tube to rotate.

6. In a method of forming a thin walled tube of organic plastic material by molding the material in a cavity mold that forms external threads on one end of the tube and shaping the molded material with an injected plunger that forms a plurality of internal driving lugs having substantial radial length and having substantial thickness on the inner surface of the tube next to the threaded portion, the step of releasing the molded tube from the mold cavity by exerting pressure on said lugs through the intermediary of complementary shaped means inserted in said tube and engaging said lugs.

7. In a method of forming a thin walled tube of organic plastic material by molding the material in a cavity mold that forms external threads on one end of the tube and shaping the molded material with an injected plunger that forms a plurality of internal driving lugs having substantial radial length and substantial thickness on the inner surface of the tube next the threaded portion, the steps of directly withdrawing the plunger and inserting a tool to engage said lugs and rotating said tube by manipulating said tool to free the tube from the mold.

8. A tube composed exclusively of molded organic plastic material having a frusto-conical end portion with external threads and a plurality of internal driving lugs having substantial radial length and substantial thickness and an integral body portion of circular cross section.

FREDERIC A. PARKHURST.